United States Patent Office 2,840,556
Patented June 24, 1958

2,840,556

PREPARATION OF SULFENMORPHOLIDES

Robert Chalk Kinstler, Dunellen, N. J., assignor to American Cyanamid Company, New York, N. Y., a corporation of Maine No Drawing. Application November 30, 1955
Serial No. 550,193

9 Claims. (Cl. 260—247.1)

This invention relates to sulfenamides. More particularly, it relates to sulfenmorpholides. Still more particularly, it relates to a method of preparing sulfenmorpholides.

Sulfenamides are of particular interest in various fields. They have found particular utility, however, as rubber chemicals and especially as vulcanization accelerators. While various sulfenamides are good accelerators, benzothiazolyl sulfenamides, and in particular benzothiazolyl sulfene morpholide, have been found to be exceptionally good.

Various procedures have been suggested for preparing sulfenmorpholides having the formula

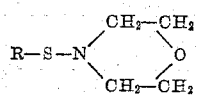

in which R is an aliphatic, carbocyclic or heterocyclic radical. For the most part, however, these procedures are objectionable for one or more of various reasons. In general, they are not satisfactory because the product can be obtained in neither high yield nor purity.

More recently there has been suggested a procedure by which sulfenmorpholides, particularly benzothiazolyl sulfene morpholide, may be obtained in quite unexpected high yield and purity. In general, this unusual procedure comprises reacting N-chloromorpholine directly with a free mercaptan in an anhydrous, inert, volatile organic solvent containing sufficient morpholine to fix by-product hydrogen chloride. The sulfenmorpholide so obtained is of unusually high purity taken in substantially quantitative yields. This suggested process is disclosed in application for United States Letters Patent Serial No. 227,510, filed May 21, 1951, now U. S. Patent No. 2,730,526 by Robert C. Kinstler, the applicant herein, of which this application constitutes a continuation-in-part.

Still more recently there has been proposed an improvement on the above-described procedure which comprises substituting the corresponding disulfide for the free mercaptan. The unexpected advantage of this modification lies in the fact that only one half of the amount of N-chloromorpholine is required to produce the same amount of sulfenmorpholide as when starting with the free mercaptan. The remaining morpholine requirement is provided as free morpholine. Accordingly, the amount of by-product hydrogen chloride is only one-half that formed when starting with the free mercaptan. The described improvement forms the subject matter of application for United States Letters Patent Serial No. 325,699, filed December 12, 1952, now U. S. Patent No. 2,730,527 by Robert C. Kinstler, the applicant herein, of which this application forms a continuation-in-part.

Despite the excellent yield and purity of product obtained by the above-described processes, neither is commercially feasible without a procedure for recovering the morpholine from the morpholine hydrochloride. Sulfenamide-type accelerators, particularly benzothiazolyl sulfene morpholide among others, are used in tremendous volume by the rubber industry. In order to meet such a demand by the above processes in an economical manner, it is necessary to recover the acceptor morpholine. Until the process of this invention, no successful and practical way had been devised for recovering the morpholine from the morpholine hydrochloride.

It is, therefore, the primary object of this invention to provide a process for recovering the morpholine from the morpholine hydrochloride of the above-described procedures. Such a process should be capable of recovering substantially the entire morpholine content. It should be recovered in a form readily reusable permitting it to be recycled in its free form or, if desired, in its chlorinated form. This recovery, moreover, should be accomplished without the addition of chemical reagents which are expensive or which might contaminate the sulfenmorpholide product. Still further, the process should be one requiring a minimum of supervisory control and no unusual equipment.

In accordance with this invention, this object has been met by a process which is surprisingly simple yet of such effectiveness as to render the above-described condensation procedures economically attractive from a commercial standpoint. In general, the morpholine is recovered by a process which involves slurrying morpholine hydrochloride in an inert organic solvent and passing anhydrous ammonia into the mixture. Rapid neutralization takes place with liberation of the morpholine and formation of ammonium chloride. The latter may then be readily separated leaving the morpholine in pure form in solution.

Although simply stated, there are various modifications which may be best described by considering the entire process for making sulfenmorpholides. Further discussion of the process forming the improvement of this invention, therefore, will be in conjunction with the process for making sulfenmorpholides, particularly 2-benzothiazolyl sulfene morpholide.

While the described condensation procedures have been found to be particularly suited for the preparation of 2-benzothiazolyl sulfene morpholide, they may readily be adopted for the preparation of various other sulfenmorpholides. Thus the mercapto radical may be an aliphatic, carbocyclic or heterocyclic radical. The mercapto radical may be derived from a free mercaptan or a disulfide. Representative of mercapto compounds which may be employed as starting materials in the condensation reaction are alkyl mercaptans such as the methyl, ethyl, propyl, butyl, t-octyl, hexyl, dodecyl and the like mercaptans; aryl mercaptans such as thiophenol, 2-aminobenzenethiol, thio-beta naphthol, thiocresol and the like; heterocyclic mercaptans such as 2-mercaptobenzothiazole, 2-mercaptonaphthothiazole and the like; disulfides of mercaptans such as 2-benzothiazolyl disulfide, dinaphthyldisulfide, diaminodiphenyldisulfide and the like; thiuram disulfides such as tetramethyl- and tetraethyl thiuram disulfide; and various substitution products of such compounds carrying such substituents as nitro, alkoxy and the like groups.

The N-chloromorpholine with which the mercaptan or disulfide is reacted may be prepared in any manner. Preferably, however, it is prepared by chlorinating morpholine in the same solvent to be employed in the condensation reaction. At any rate, the selected mercaptan or disulfide is reacted with a substantially chemically equivalent amount of N-chloromorpholine. In the case of the disulfide, there will also be present a chemically equivalent amount of free morpholine.

This reaction is conducted in an inert, anhydrous, volatile organic solvent. The solvent may be widely varied and is restricted only in that it be anhydrous and inert to the reaction. Any of the well known organic solvents may be employed such as the chlorinated aliphatic hydrocarbons, for instance, carbon tetrachloride and trichloroethylene, benzene and its homologs and their halogenated derivatives, nitrobenzene, thiophene, and the like. Hydrocarbons of the benzene series such as benzene, toluene and the xylenes, as well as chlorobenzene, are preferred.

The condensation reaction also requires the use of morpholine as the hydrogen chloride acceptor. The amount of acceptor morpholine employed need be no more than that required to fix by-product hydrogen chloride. When conducting the reaction with a disulfide, the total amount of free morpholine will be the amount serving as the acceptor plus the amount entering into the reaction with the disulfide.

There are no critical conditions under which the reaction is conducted. It may, if desired, be accompanied by heating. The temperature employed depends to some extent on the particular reactants involved and may vary from room temperature to 100° C. The reaction is preferably conducted with agitation which may be by any conventional means.

On completion of the reaction, the product sulfenmorpholide is recovered from the reaction liquor. This may be readily accomplished by first separating the morpholine hydrochloride as by filtration leaving the sulfenmorpholide in solution. The product is then recovered by evaporation or steam distillation of the solvent.

It is at this point that the improvement comprising the process of this invention is incorporated into the procedure for preparing the sulfenmorpholide. The acceptor morpholine may be conveniently recovered from its hydrochloride by slurrying the latter in an inert solvent and saturating the slurry with anhydrous ammonia. Rapid neutralization takes place with liberation of morpholine and formation of ammonium chloride. The latter may be readily removed as by filtration, leaving the morpholine in pure form in solution. This solution may then be recycled.

Preferably, neutralization of the morpholine hydrochloride is conducted prior to recover of the sulfenmorpholide. Thus, the reaction liquor is saturated with ammonia, liberating the morpholine and precipitating ammonium chloride. The latter is then separated and the sulfenmorpholide recovered by distilling the morpholine and solvent. If the morpholine and solvent are sufficiently different in boiling points, they can be separately recovered. If not, the separation may be accomplished by further distillation of the morpholine-solvent mixture. Preferably, however, the morpholine-solvent mixture is recycled as above described. The sulfenmorpholide may also be recovered by extracting the morpholine with water followed by distillation of the solvent from the sulfenmorpholide. The morpholine may be recovered from the water extract also by distillation and recycled along with recovered solvent.

Although the process of this invention has been described to this point in conjunction with recovering the morpholine from the reaction mass comprising the sulfenmorpholide, a surprising feature of the process is that it is just as applicable in the beginning of the condensation procedure. Preferably, the N-chloromorpholine required for the condensation reaction is formed in the same solvent to be used in the reaction by passing chorine into a solution of morpholine in the solvent. Formed as a by-product of this chlorination is a chemically equivalent amount of morpholine hydrochloride. This may be separated as such and treated in accordance with this invention for the recovery of morpholine.

Alternately, it may be carried as such through the process to be subsequently treated after the reaction. Preferably, however, the slurry comprising dissolved N-chloromorpholine and solid morpholine hydrochloride is saturated with ammonia to liberate the morpholine and precipitate ammonium chloride. The liberated morpholine is then present in sufficient quantity to serve as the hydrochloride acceptor in the condensation reaction. What is particularly surprising and of unusual advantage is that the precipitated ammonium chloride is inert to the condensation reaction and, therefore, need not be separated prior thereto. It may be carried directly through the condensation reaction to be subsequently separated with ammonium chloride precipitated by neutralization of morpholine hydrochloride formed during said reaction.

One additional modification should be noted. It may be desirable to have free ammonia present during the condensation reaction. To this end, free ammonia may be made present in the solution of N-chloromorpholine and morpholine, or other free amine, prior to the addition of the free mercaptan or disulfide. This has the advantage of decreasing the amount of ammonia required after reaction is complete and of shortening the time for complete neutralization.

The invention will be further illustrated by the following examples which are not intended to be restrictive. Unless otherwise noted, all parts are by weight.

EXAMPLE 1

*2-benzothiazolyl sulfene morpholide*

To a mixture of 192 parts of morpholine and 2200 parts of monochlorobenzene is added 80 parts of chlorine gas while stirring and cooling below 45° C. The resultant mixture is then saturated with anhydrous ammonia to neutralize morpholine hydrochloride and form ammonium chloride. To the resultant slurry is added 174 parts of 2-mercaptobenzothiazole and the reaction mixture stirred and cooled to maintain the temperature below 50° C. After reaction is complete, the reaction mass is saturated with anhydrous ammonia. Ammonium chloride is filtered, the cake washed with 1000 parts of monochlorobenzene and combined filtrate and washing extracted with 350 parts of water three times. The aqueous extract analyzes 97.5 parts of morpholine. Residual monochlorobenzene solution is evaporated under reduced pressure and the solvent recovered. The molten residue yielded 259.4 parts of 2-benzothiazolyl sulfene morpholide melting at 83.5–85.9° C. The yield of product based on morpholine not recovered is 94.6%.

EXAMPLE 2

*2-benzothiazolyl sulfene morpholide*

At a temperature below 40° C., a mixture of 192 parts of morpholine in 2200 parts of monochlorobenzene is chlorinated with 35.5 parts chlorine and then saturated with anhydrous ammonia to give a solution of N-chloromorpholine and morpholine and precipitated ammonium chloride. To this slurry is added with stirring 166 parts of 2-benzothiazolyl disulfide while maintaining the temperature below 50° C. The reaction mixture is then saturated with anhydrous ammonia, ammonium chloride separated by filtration, and the filter cake washed with 1000 parts of monochlorobenzene. Combined washing and filtrate are then distilled under reduced pressure yielding a mixture of morpholine and monochlorobenzene which analyzes 102.2 parts of morpholine. The residue from this distillation yields 252 parts of 2-benzothiazolyl sulfene morpholide melting at 82.0–85.4° C. The yield of product based on unrecovered morpholine is 96.9%.

EXAMPLE 3

*Phenyl sulfene morpholide*

A mixture of 287 parts of morpholine in 2100 parts of monochlorobenzene is chlorinated with 58 parts of chlorine while stirring and cooling below 40° C. after which the mixture is saturated with anhydrous ammonia. 90 parts of thiophenol are then added to the reaction mixture which is then heated to 60° C. and agitated. After reaction is complete, the mixture is saturated with anhydrous ammonia. Ammonium chloride is filtered, washed with monochlorobenzene, and combined filtrate and washings evaporated under reduced pressure at 90–100° C. The distillation residue is phenyl sulfene morpholide obtained in the form of an amber-colored oil having a melting point of 31–33° C. The distillate of monochlorobenzene and morpholine analyzes 225 parts of morpholine. Yield of product based on unrecovered morpholine is 97%.

EXAMPLE 4

*Beta-naphthyl sulfene morpholide*

To a mixture of 287 parts of morpholine in 2650 parts of monochlorobenzene is added 43.5 parts of chlorine with stirring and cooling below 40° C. The chlorinated mixture is then saturated with anhydrous ammonia to neutralize morpholine hydrochloride, and 98 parts of beta-thionaphthol added. Resultant reaction mixture is then saturated with anhydrous ammonia with stirring at 50–60° C. Ammonium chloride is collected by filtration, washed with monochlorobenzene and combined filtrate and washings distilled at reduced pressure at about 100° C. A monochlorobenzene-morpholine distillate and 124 parts of crude beta-naphthyl sulfene morpholide are obtained as a reddish colored oil which on recrystallization from petroleum ether melted at 80.0–81.9° C. The monochlorobenzene-morpholine distillate analyzes 228 parts of morpholine. The yield based on unconsumed morpholine is quantitative.

EXAMPLE 5

*Dodecyl sulfene morpholide*

With stirring and cooling below 40° C., 35.5 parts of chlorine gas are passed into a solution of 218 parts of morpholine in 1000 parts of monochlorobenzene after which the mixture is saturated with anhydrous ammonia. 101 parts of dodecyl mercaptan are then added with stirring at 55° C. for 1 hour. The reaction mixture is then saturated with anhydrous ammonia under a pressure of about 1–2 cm. of mercury, precipitated solids are removed by filtration and washed with monochlorobenzene. Combined filtrate and washings are distilled under reduced pressure at about 100° C. leaving 143.5 parts of dodecyl sulfene morpholide in the form of a colorless oil crystallizing at 24–25° C. The monochlorobenzene-morpholine distillate analyzes 172 parts of morpholine. Yield of product based on unrecovered morpholine is 94.6%.

EXAMPLE 6

*o-Aminophenyl sulfene morpholide*

A mixture of 435 parts of morpholine in 800 parts of monochlorobenzene is chlorinated by passing in 71 parts of chlorine gas while stirring and cooling below 40° C. The mixture is then saturated with anhydrous ammonia under a pressure of 1–2 cm. of mercury. With stirring and cooling there is then added gradually 125 parts of o-amino-thiophenol. The reaction mixture is again saturated with anhydrous ammonia and precipitated ammonium chloride removed by filtration and washed with monochlorobenzene. Combined filtrate and washings are evaporated at reduced pressure giving 186 parts of o-aminophenyl sulfene morpholide in the form of a reddish oil. The monochlorobenzene-morpholine distillate contains 360 parts of morpholine. Yield of product based on unrecovered morpholine is substantially quantitative.

EXAMPLE 7

*Dimethylthiuram sulfene morpholide*

With cooling and stirring, 43 parts of chlorine gas are passed into a solution of 313 parts of morpholine in 2000 parts of monochlorobenzene. The mixture is then saturated with anhydrous ammonia and 114 parts of tetramethylthiuram disulfide added. After stirring the mixture at 50° C. and again saturating with anhydrous ammonia, precipitated solids are removed by filtration and washed with monochlorobenzene. The solvent is removed by distillation at reduced pressure leaving 239 parts of dimethylthiuram sulfene morpholide as a crystalline residue melting at 84.9–85.8° C.

EXAMPLE 8

*t-Octyl sulfene morpholide*

A solution of 79 parts of N-chloromorpholine, 298 parts of morpholine and 1000 parts of monochlorobenzene is saturated with anhydrous ammonia and 100 parts of t-octyl mercaptan added. The reaction mixture is stirred at 60–65° C. and again saturated with anhydrous ammonia. Precipitated solids are removed by filtration and washed with 1000 parts of monochlorobenzene. Combined filtrate and washings are distilled in vacuum leaving 144 parts of t-octyl sulfene morpholide as an amber colored oil. The monochlorobenzene-morpholine distillate analyzes 238 parts of morpholine. Yield of product based on unrecovered morpholine is 90.7%.

I claim:

1. In the preparation of sulfenmorpholides which comprises reacting N-chloromorpholine directly with a compound selected from the group consisting of free mercaptans and disulfides in an anhydrous, inert, volatile organic solvent containing sufficient free morpholine to fix by-product hydrogen chloride as morpholine hydrochloride, and recovering the sulfenmorpholide from the reaction liquor, the improvement in combination therewith of liberating morpholine from the morpholine hydrochloride which comprises: slurrying the morpholine hydrochloride in an inert organic solvent and saturating the slurry with anhydrous ammonia.

2. A process according to claim 1 in which the reaction liquor slurry comprising dissolved sulfenmorpholide and slurried morpholine hydrochloride is saturated with ammonia to form ammonium chloride and morpholine, ammonium chloride is separated, and residual liquor treated to recover the sulfenmorpholide from the morpholine and solvent.

3. A process according to claim 2 in which the residual liquor is subjected to distillation to obtain a distillate of morpholine and solvent.

4. A process according to claim 2 in which morpholine is extracted from the residual liquor with water.

5. A process according to claim 1 in which the morpholine hydrochloride is separated from the reaction liquor, slurried in an inert organic solvent and the slurry saturated with ammonia to form a solution of morpholine and a precipitate of ammonium chloride.

6. In the preparation of sulfenmorpholides which comprises reacting a compound selected from the group consisting of free mercaptans and disulfides directly with a solution of N-chloromorpholine in an anhydrous, inert, volatile organic solvent containing sufficient free morpholine to fix by-product hydrogen chloride, the improvement in combination therewith of preparing a solution of N-chloromorpholine and morpholine which comprises: chlorinating a solution of morpholine in an anhydrous, inert, volatile organic solvent and saturating the resultant reaction liquor with anhydrous ammonia to neutralize by-product morpholine hydrochloride.

7. A process of preparing benzothiazolyl sulfene morpholide which comprises: chlorinating morpholine in an anhydrous, inert, volatile organic solvent to form a mixture of N-chloromorpholine and precipitated morpholine hydrochloride; providing in said solution sufficient morpholine to fix by-product hydrogen chloride formed on addition to said solution of a compound selected from the group consisting of 2-mercaptobenzothiazole and 2-benzothiazolyl disulfide; adding said compound in amount sufficient to react with said N-chloromorpholine; saturating resulting reaction liquor with anhydrous ammonia to form ammonium chloride and morpholine, separating ammonium chloride, recovering 2-benzothiazolyl sulfene morpholide from the solution of morpholine and recycling the latter.

8. A process according to claim 7 in which morpholine required to fix by-product hydrogen chloride is provided by saturating the mixture of N-chloromorpholine and precipitated morpholine hydrochloride with ammonia whereby morpholine is liberated and ammonium chloride formed.

9. A method of preparing a solution of N-chloromorpholine and morpholine in an anhydrous inert organic solvent which comprises: chlorinating a solution of morpholine in an anhydrous inert organic solvent to form a slurry comprising dissolved N-chloromorpholine and precipitated morpholine hydrochloride, and saturating said slurry with anhydrous ammonia to form a solution of N-chloromorpholine and morpholine, and precipitated ammonium chloride.

References Cited in the file of this patent

UNITED STATES PATENTS

| | | |
|---|---|---|
| 2,271,834 | Carr | Feb. 3, 1942 |
| 2,408,975 | Engel | Oct. 8, 1946 |
| 2,730,526 | Kinstler | Jan. 10, 1956 |